(12) United States Patent
Sprague et al.

(10) Patent No.: US 8,078,975 B2
(45) Date of Patent: Dec. 13, 2011

(54) METHOD FOR ADDING METADATA TO SCANNED DOCUMENTS

(75) Inventors: Mary Ann Sprague, Macedon, NY (US); M. Armon Rahgozar, Penfield, NY (US); Peter M. Cucci, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 2110 days.

(21) Appl. No.: 10/452,693

(22) Filed: Jun. 2, 2003

(65) Prior Publication Data
US 2004/0070613 A1 Apr. 15, 2004

Related U.S. Application Data

(60) Provisional application No. 60/415,163, filed on Sep. 30, 2002.

(51) Int. Cl.
*G06F 3/00* (2006.01)
*G06F 3/048* (2006.01)

(52) U.S. Cl. ........ 715/747; 715/807; 715/806; 715/746; 715/733

(58) Field of Classification Search .................. 715/505, 715/506, 500, 747, 744, 733, 507, 512, 807
See application file for complete search history.

(56) References Cited

U.S. PATENT DOCUMENTS

| | | | |
|---|---|---|---|
| 6,230,171 B1 * | 5/2001 | Pacifici et al. ................ 715/512 |
| 6,784,873 B1 * | 8/2004 | Boesen et al. ................ 345/173 |
| 2004/0177319 A1 * | 9/2004 | Horn ........................... 715/501.1 |
| 2004/0205529 A1 * | 10/2004 | Poulose et al. ................ 715/506 |

* cited by examiner

*Primary Examiner* — Boris Pesin
*Assistant Examiner* — Sabrina Greene
(74) *Attorney, Agent, or Firm* — Ronald E. Prass, Jr.; Prass LLP

(57) ABSTRACT

A method for creating a metadata field in a template, which includes receiving a template selection, receiving a selection of a new metadata field, receiving properties of a metadata field to be added to the template, storing the properties of the metadata field, and downloading the metadata field to a scanning device in response to a signal from the scanning device.

21 Claims, 9 Drawing Sheets

METHOD FOR ADDING METADATA TO SCANNED DOCUMENTS

This application is based on a Provisional Patent Application No. 60/415,163, filed Sep. 30, 2002.

BACKGROUND AND SUMMARY

Many third party applications use scanned documents for their applications. These documents are often handled in a generic manner without being able to add information that could benefit a user's workflow, e.g. an account name to file under. Without the additional, value-add information, the documents may not be processed by the applications in the most optimal way, or they may require additional processing to complete the intended workflow.

One way to alleviate this problem is to add metadata to the document when it is scanned. Metadata provides the ability for users to add information to their jobs, either at the walkup screen or during the programming of the templates, that assists in the workflow of the documents, thereby increasing the effectiveness of processing and also cutting the processing time down. However, when a scanning device captures a document, the means for entering metadata may be limited. Some scanning devices, or multi-function devices, lack an adequate user interface for entering document metadata. Some current solutions require that the metadata be specified in advance in a "scan template" or a machine readable "paper UI".

The ability for a third party application to specify a set of needed information that can be entered before a job is scanned enables the application to take full advantage of the processing ability of the application, as well as streamline the workflow for an application. When the scanning device user interface can be used as the input for this value-add information, it eliminates additional steps in the workflow for manual processing of a document after scanning. It can also provide additional information that may otherwise be lost once the document is scanned.

Embodiments include a user interface to allow users to customize their jobs by adding metadata attribute/value pairs. The attributes could be added either to the job template, thus applying to all jobs, or to an individual job. The attribute values would then be available for use by other, perhaps third party, applications in subsequent steps of the workflow.

Embodiments include a method for creating a metadata field in a template, which includes receiving a template selection, receiving a selection of a new metadata field, receiving properties of a metadata field to be added to the template, storing the properties of the metadata field, and downloading the metadata field to a scanning device in response to a signal from the scanning device.

BRIEF DESCRIPTION OF THE DRAWINGS

The embodiments will be described in detail herein with reference to the following figures in which like reference numerals denote like elements and wherein.

DETAILED DESCRIPTION OF EMBODIMENTS

The embodiments disclosed herein relate to devices having scanning capabilities. These include, for example, printing devices (printers, copiers, multi-function devices) and free-standing scanners that may be electronically connected to computers, storage devices, or printing devices, among others. Destination devices for scanned images or text include the scanning device itself as well as external devices.

Documents may include images, text, or both.

Figure 11:
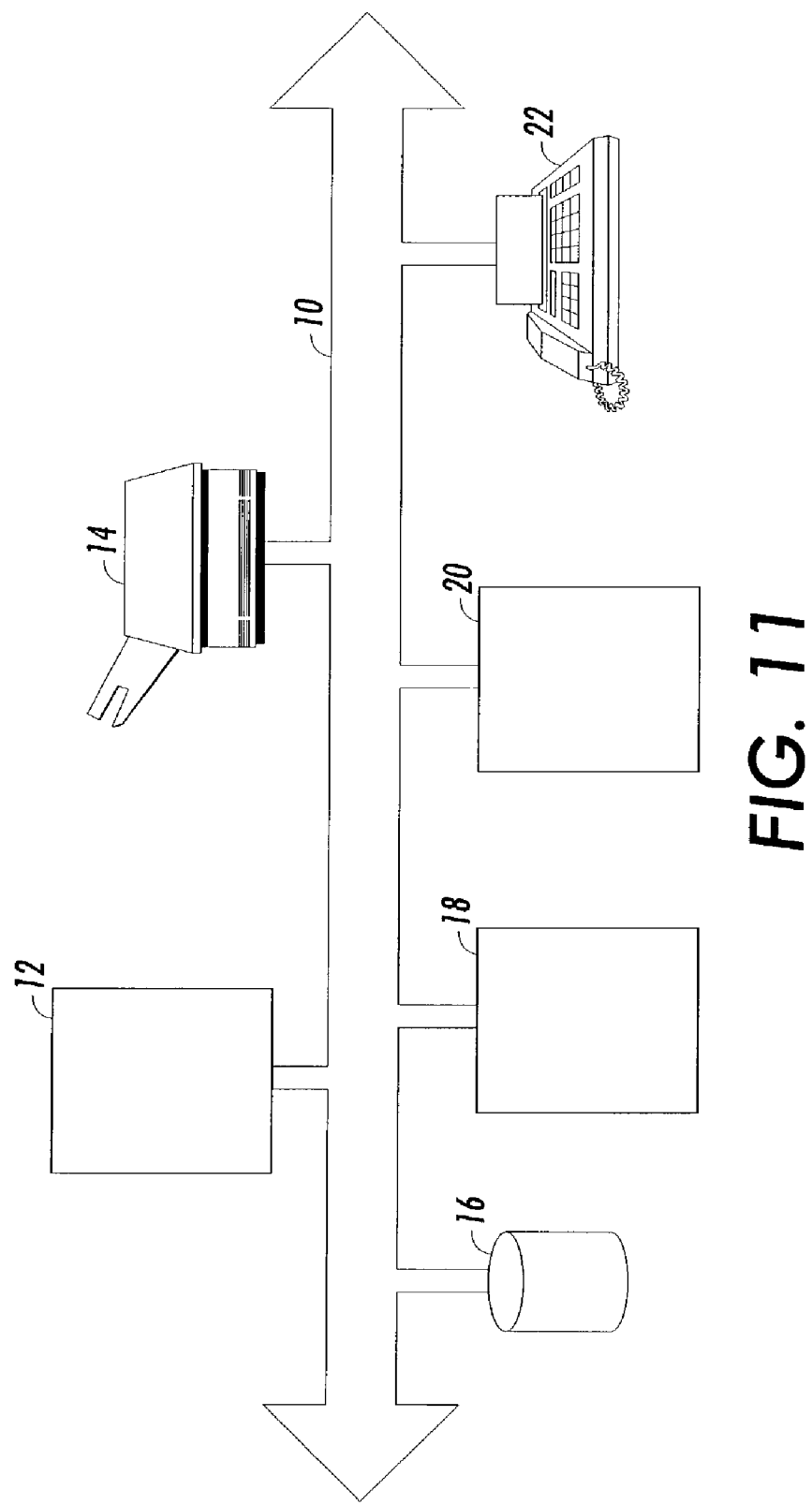
FIG. 11 illustrates a schematic diagram of a system using the methods disclosed herein.

FIG. 11 is a simplified diagram showing an example of a networked document-services system in which the present invention might be used. A network bus 10, which may be of any type known in the art, such as Ethernet or Token-Ring, interconnects a number of computers and peripherals. For example, on network 10 there would be typically any number of personal or mainframe computers 12, scanners 14, shared memory/storage 16, and printing devices 18, 20. A printing device can be a copier, printer, digital copier, etc. Some of the printing devices 18, 20 also contain scanning devices. The network 10 may further interconnect a fax machine 22, which in turn connects with a standard telephone network. What is important is that the various computers and peripherals can interact to perform various document services. Both the computers 12 and the shared memory 16 are electronically connected to the scanners 14 and the printing devices 18, 20.

A user scans a document by walking up to a scanning device, putting documents in the feeder, selecting a scan option, selecting the intended output format (e.g., an email or fax distribution, a routing to the desktop, or insertion as part of a workflow or into a document management system, etc.), and then activating the device (typically, by pressing a start button).

A scanned document is usually printed or electronically stored either locally or remotely. The scanned document is often referred to as a job. Typically, the data for each job is accompanied by job data, which is information sent with a scanned file that instructs the destination device about the document; e.g., where to store information, in what format to store it. A "job ticket," which is an additional set of data generated at the time of job creation, which in this case is the scanning of the document. The job ticket typically identifies a quantity of scanned data as a single job, and may also include identifying information such as, for example, the source of the scanned data, the time the scanned data was sent to the printer, and so forth. The data may also be accompanied by a "job log," which is information about a scan job that is stored with the scan job.

After the scanning device scans the job, it targets the scanned document to a destination as described by the user's intent in either the job log or the job ticket. The entity that captures and carries the user's intent is referred to as a scan job template or a job template for short. The template can be filled out before or after the scan job. In embodiments, the filled template could become part of the job ticket. The template could contain information about the job. The "filled" job template can also become part of the job log. The job log is often used by the target destination, e.g. a workflow system or a document management system, for further processing.

The templates can also have areas where a user has the capability of adding other information. In embodiments, metadata fields can be added to allow the user to add more information in processing the documents. However, scanning devices typically lack an adequate UI for entering document metadata.

FIGS. 5-8 illustrate an exemplary embodiment of a UI that allows a user to add metadata to a scanned document. In embodiments, any number of data items can be captured. Typically, a user is not required to enter a value for every metadata element, i.e. attribute, for which the local UI (walkup screen) prompts. In embodiments, there are no restrictions on the number of metadata elements, i.e. attributes, that a user can specify.

FIGS. 1-4 illustrate an exemplary embodiment of an application that allows the user to create individualized metadata fields that will appear on a scanning device UI such as the one shown in FIGS. 5-8. The application provides an interface where the user can enter information that is then translated into a job template. The embodiments of job template creation applications disclosed herein could be web-based or included on a local desktop or mainframe computer application. This user-created field can be used for one job or multiple jobs.

Figure 1:
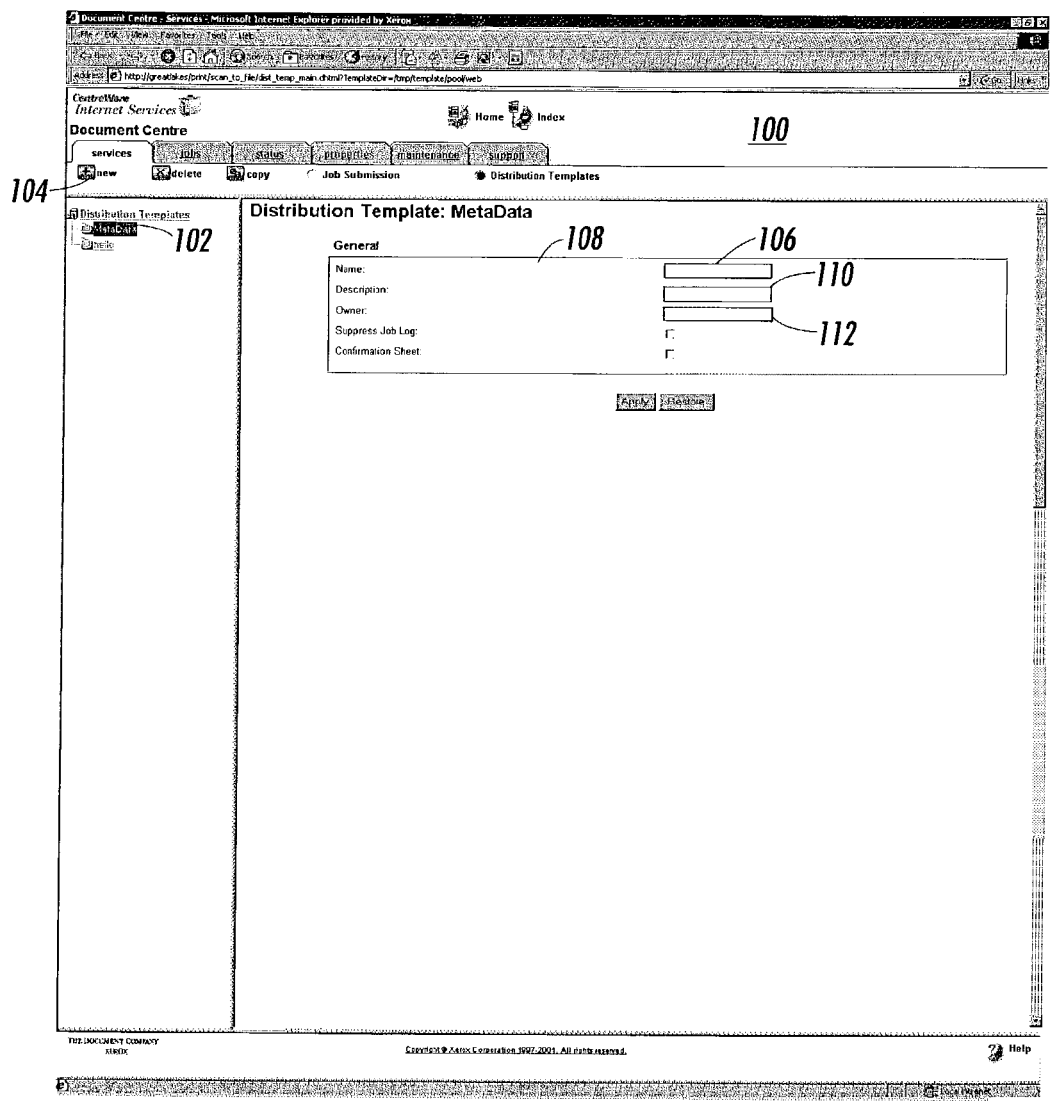
FIG. 1 illustrates an exemplary embodiment of a first display screen of an application UI.

The user first chooses a template. The user can either create a new metadata template or modify an existing one. In embodiments, the user would select a feature such as the feature 104 labeled "new" in FIG. 1. Selecting feature 104 causes a screen such as, for example, screen 100 shown in FIG. 1, to appear. The user would then enter the name of the template in the field 106 corresponding to "Name:" in the box labeled "General" 108. The user can also enter a description in the field 110 corresponding to "Description:". The user can also enter an owner in the field 112 corresponding to "Owner:". The user also has the option of selecting to suppress the job log or selecting that a confirmation sheet be produced. The fields shown in FIG. 1 are meant to be exemplary. Other potential fields include "Address," "Routing Code," and "Title." The document management system user, or the creator of the scan job template, can create any metadata entry fields that she desires and that metadata need not be restricted to a pre-defined set specified by the scanning device.

Alternatively, the user could choose to modify an existing template. To modify an existing template, the user simply selects one of the previously created templates 102 on the left-hand side of FIG. 1. In the exemplary steps disclosed herein, the template 102 is called "MetaData."

Figure 2:
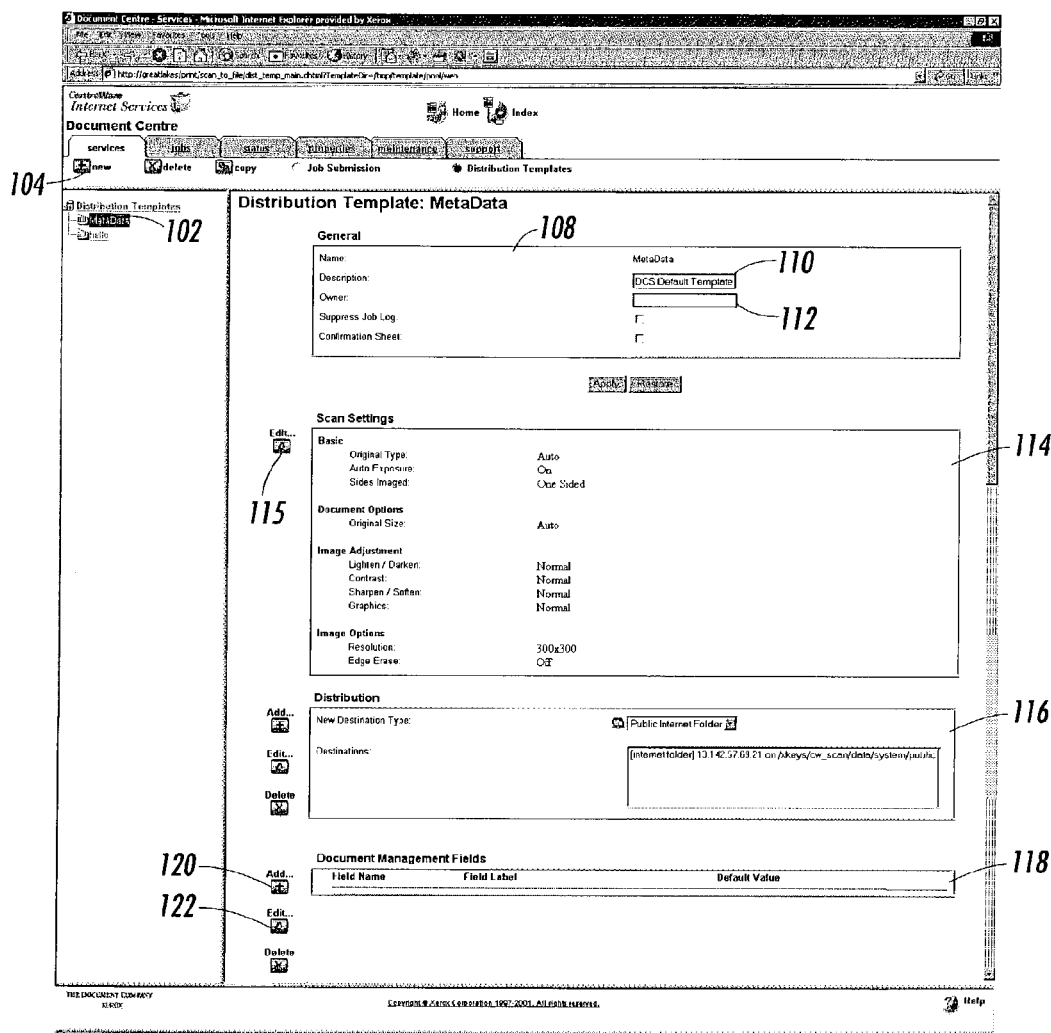
FIG. 2 illustrates an exemplary embodiment of a second display screen of an application UI.
Figure 3:
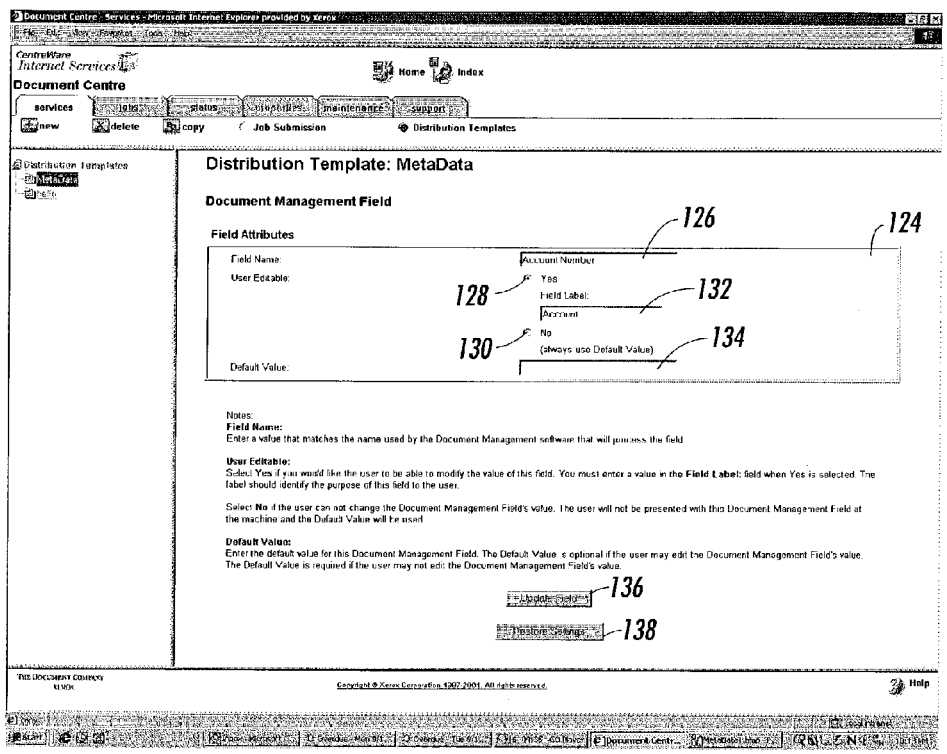
FIG. 3 illustrates an exemplary embodiment of a third display screen of an application UI.

If the user selects MetaData from the list on the left, the screen will change to that of FIG. 2. In embodiments, once the MetaData box is selected, the "Scan Settings" box 114 will appear with a number of selected options for that template. The box labeled "Scan Settings" 114 lists the attributes associated with the template MetaData. These are editable if the user selects the feature labeled edit 115 next to the Scan Settings box. In embodiments the Scan Settings box 114, Distribution box 116, and the Document Management Fields box 118 are not present until a template is chosen or created.

In order to add a new field to the template MetaData 102, a user would select the feature labeled "add" 120 located adjacent the box containing the listing of added metadata fields 118. In embodiments this box is labeled "Document Management Fields." However, the specific name is unimportant. Selecting this feature causes the page illustrated in FIG. 3 to appear. To edit a previously created metadata field a user would select the edit feature 122 next to the metadata fields box 118.

In the box 124 labeled "Field Attributes," the user can enter a field name in the field 126 corresponding to "Field Name:". For example, the user may enter "Account Number" as indicated in the field 126 of FIG. 3. The user may also select whether the document management field is editable or not by selecting either the yes 128 or the no 130 radio button. In embodiments, if the user selects the field to be user editable, the user must select a field label 132 for the document management field. The interface also includes a "Default Value" field 134. If the user selects the document management field to not be user editable, the default value field 134 must be filled in. If the user selects the document management field to be user editable, then the default value field 134 is optional and may or may not be filled in by the user. When finished adding or updating a metadata field, the user selects the update field feature 136 to save any changes, or alternatively, the user may select the restore settings feature 138 to exit without adding or editing a new document management field. If the update field feature 136 is selected, then the display of FIG. 4 is displayed.

Figure 4:
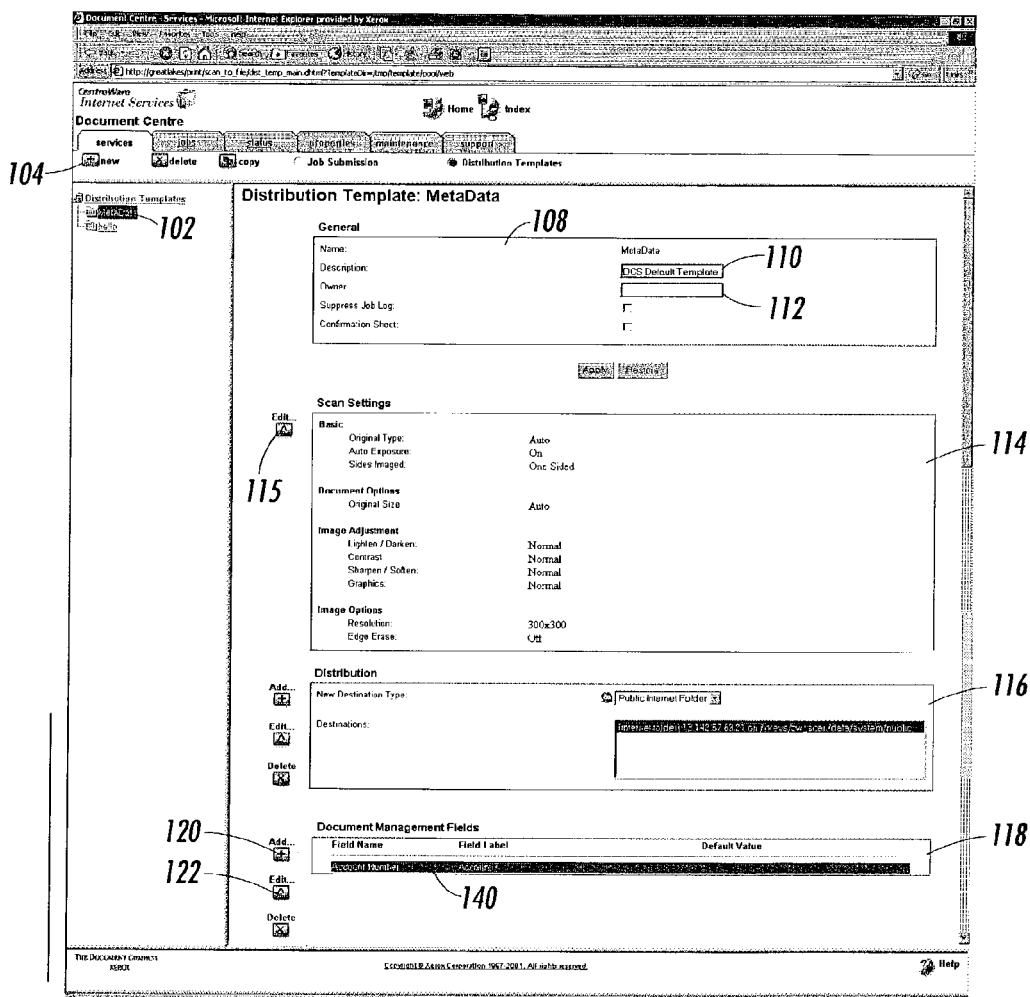
FIG. 4 illustrates an exemplary embodiment of a fourth display screen of an application UI.

FIG. 4 is very similar to FIG. 2, except that FIG. 4 includes a user defined document management field, "Account Number" 140 in the Document Management Fields box 118.

Figure 9:
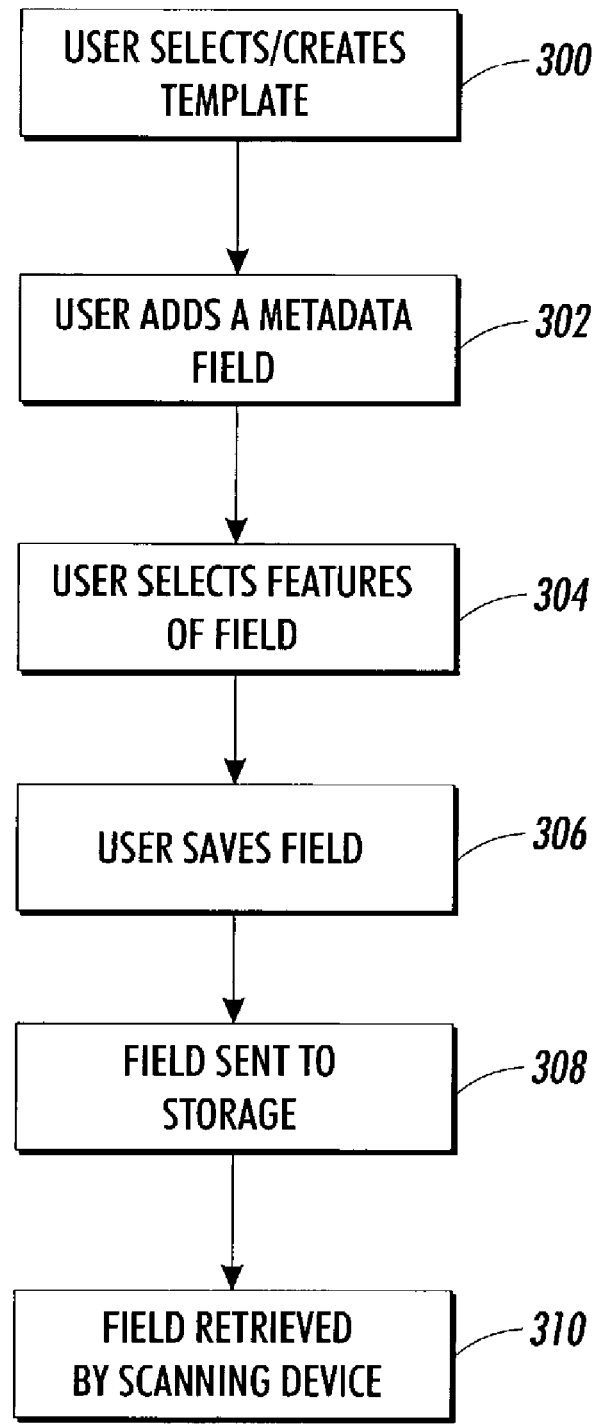
FIG. 9 illustrates a flow chart of an exemplary embodiment of a method of adding a metadata field to a UI of a scanning device.

FIG. 9 shows a flow chart outlining the method of creating a new metadata field for scanned objects. The user first opens the application. The user next selects a template to which to add a metadata field, or alternatively, creates a new one 300. The application presents a new field to the user offering the user the chance to create and add a new metadata field. The user selects to add a metadata field to the template 302. The user then selects features associated with the metadata field 304. Selecting features includes naming the field and designating whether it is user-editable or not. Finally, the user saves the features selected for the field 306.

After the user creates a metadata field in a template, the template is then stored in a database 308 that is accessible by scanning device 14. The storage can be local 12 or remote, such as, for example, the shared memory/storage 16. The scanning device then accesses the storage area and updates its templates 310.

The scanning device can access the information in any of a variety of ways known in the art. One method would be to have the scanner automatically access the storage area as part of a daily update process. Newly created or updated templates over the course of a day would get entered during one period, such as between 12:00 am and 1:00 am. Another method would be for the scanning device to update in response to a user selection. For example, FIG. 5 includes a feature 201 labeled update template list. The user would select this feature to update the template list 200 on the left-hand side of the screen. In embodiments, the scanning device would then access the database or other electronic file storage where the templates are recorded and both retrieve new templates as well as update already listed templates.

When the user selects a scan job template, prompts are displayed at the local UI of the device where the user enters the requested values. Once job templates are created, they are made to be accessible at the local UI of the scanning device.

Figure 5:
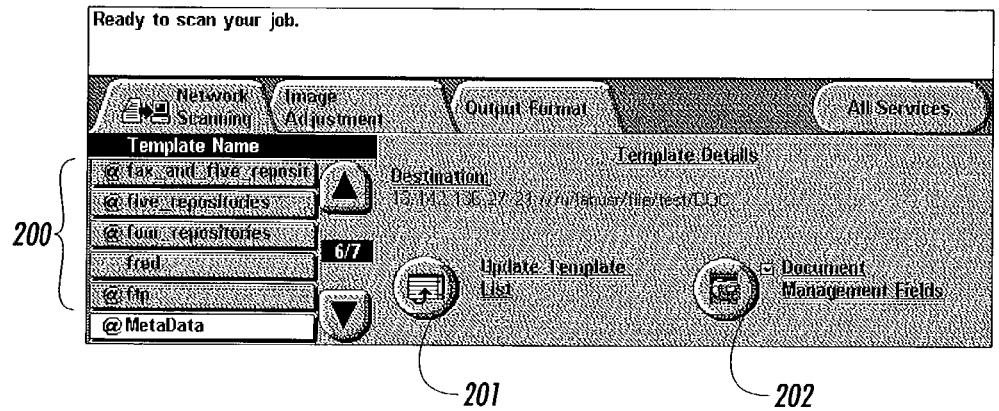
FIG. 5 illustrates an exemplary embodiment of a first display of a scanning device UI.

A user first selects a template. In embodiments, the templates are arranged as selectable features 200 as shown in FIG. 5. After the user selects a template, the user would depress a feature 202 corresponding to the added metadata fields for the selected template. In embodiments this feature 202 is labeled "Document Management Fields," although a myriad other names could be used. In the illustrated embodiment, the MetaData template that was modified in FIGS. 1-4 has been selected.

Figure 6:
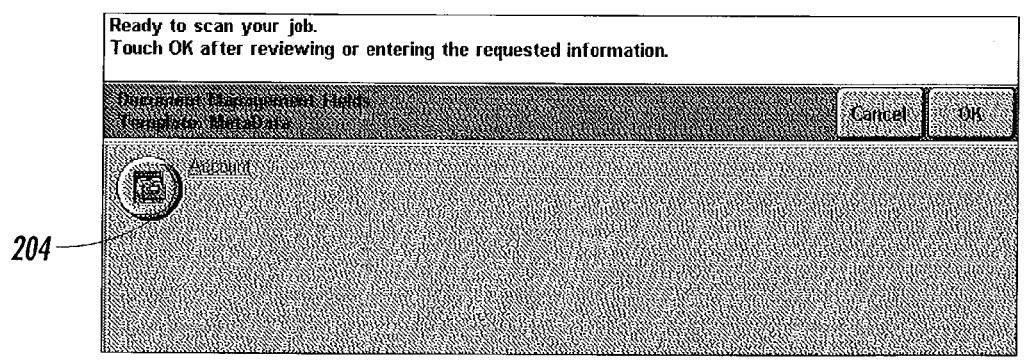
FIG. 6 illustrates an exemplary embodiment of a second display of a scanning device UI.

Selecting the fields feature 202 causes the display of FIG. 6 to appear. This user is now presented with a feature 204 labeled "Account." Account was the field label of the metadata field that was created in FIGS. 1-4. If a template contained more than one metadata field, other features would be present on the screen. For example, in addition to account, there might be fields for social security numbers, sex, financial data, etc. To add information to this particular field, the user would select the feature 204 labeled "Account." This causes FIG. 7 to appear.

Figure 7:
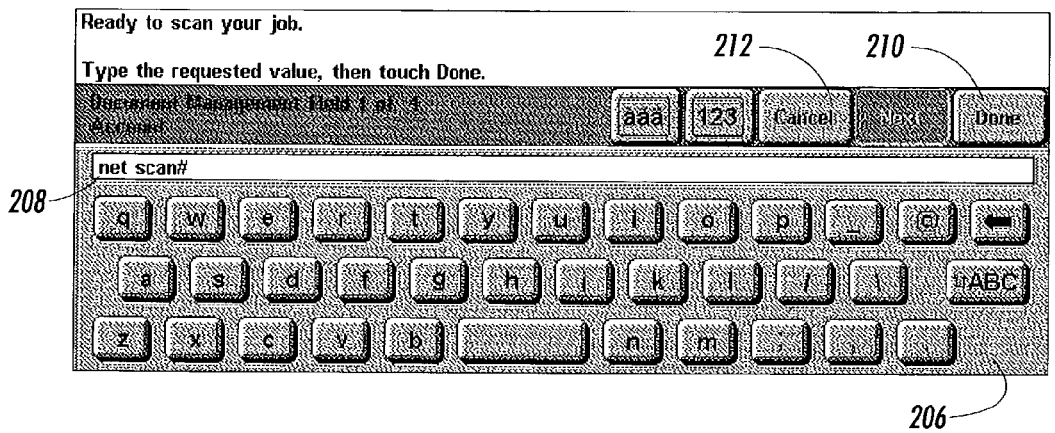
FIG. 7 illustrates an exemplary embodiment of a third display of a scanning device UI.

FIG. 7 shows an exemplary embodiment of a graphical image of a keyboard 206. After a user selects a metadata field to alter, the user then enters alphanumeric values, punctuation, and any other symbols available to the user into the available field 208. In FIG. 7, the value "net scan#" has been entered into the field 208. When finished, the user would select a feature 210 indicating the user is finished adding values to the field 208. In embodiments, this feature is labeled "Done." The user also has the option of canceling any changes that were made by selecting the "Cancel" feature 212.

Figure 8:
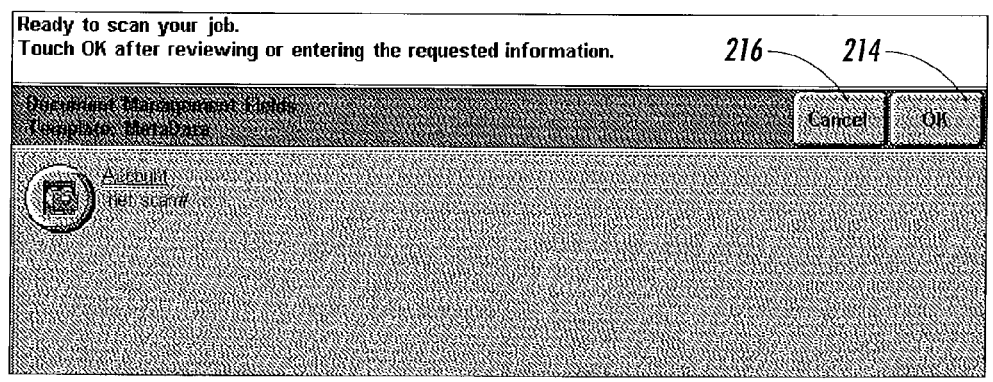
FIG. 8 illustrates an exemplary embodiment of a fourth display of a scanning device UI.

Once the user has selected done 210, a screen such as the one shown in FIG. 8 appears. This screen is similar to the screen of FIG. 6, but now the user-entered value "net scan#" appears below the "Account" label. In embodiments, if the user is satisfied with the value, the user selects the feature labeled OK 214 and returns to the screen 214 shown in FIG. 5. In embodiments, selecting the feature labeled Cancel 216 undoes any changes the user made to the metadata field and returns the user to the screen of FIG. 5.

These values are stored in the job log when the scanning operation is completed.

Figure 10:
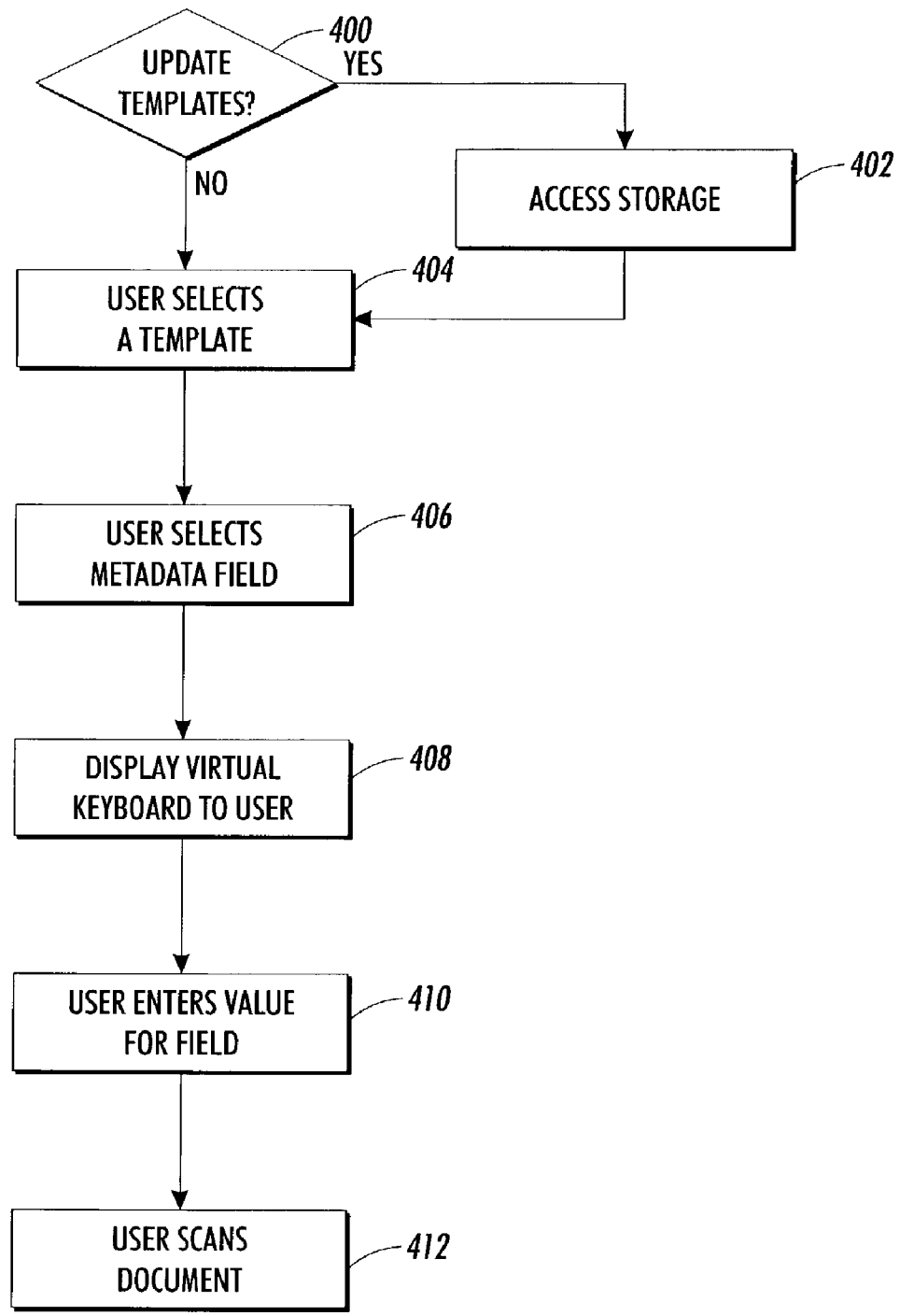
FIG. 10 illustrates a flow chart of an exemplary embodiment of a method of scanning at a device with a user-added metadata field.

FIG. 10 shows a flow chart outlining the process of adding metadata to a document. The user first selects the scan option. The user is then presented with a list of templates. In embodiments, the user is given the choice of updating the list of templates 400. If the user chooses to update the fields then the scanning device accesses the storage area where the user created/modified templates are stored and updates its own list of templates 402. The user then selects a template 404. The user then selects a metadata field to which to add information 406. In embodiments, the application then displays a virtual keyboard to user 408. The user then enters that information with the virtual keyboard 410. Finally, the user activates the scanner to complete the scan job 412. At this point, the information becomes either part of the "job log" or the "job ticket"

Once a user selects a template, and all the metadata fields are completed, the user the scanning device executes the scan job based on that intent. The scanning device then transmits the scanned job and the associated job log to its target destination(s). While transmitting the scanned document to its destination(s), the scanning device attaches a copy of the "filled" job template with each scanned document to each destination. The "filled" job template is the same as the job template that user selected to carry her intent with some the defaults resolved to the actual parameters used for scanning and transmission. The architectural solution should be independent of the choice of UI, e.g. one user may desire entering the data at the local UI while another may prefer to use a paper UI. The document management systems can then use the values associated with the filled in metadata fields for a variety of purposes, such as, for example, indexing the scanned document in it document repository.

The attribute values would then be available for use by other, perhaps third party, applications in subsequent steps of the workflow. For example, in an insurance company, metadata elements specifying an account name and policy number could be added to all scanned documents and used to populate fields in a document repository. A third party application could then query the repository for all documents associated with that account name or policy number.

The following is an exemplary embodiment of a software method for implementing the methods described herein. It is one example For this example, a description object, XRX_DSCRPT_METADATA, describes the new metadata attributes. Each invocation of the XRX_DSCRPT_METADATA description object provides a "pattern" for capturing data about a particular attribute, i.e. its "metadata" or "data about data."

For this example, the relevant metadata fields include:

MetaDataDefaultValue—This field contains the default value that is to be used for the given metadata field. The contents of the MetaDataDefaultValue attribute are displayed to the end user at a local UI as the initial MetaDataValue attribute value (see below).

MetaDataFieldName—This field specifies the name of the metadata field.

MetaDataPrompt—This field stores the localized string that is presented to the user at the local UI to ask for the desired metadata value. If this value is blank, then that MetaData entry is not displayed to the user at the local UI.

MetaDataType—This field lists the type of the value that is being captured from the user. In the initial implementation, most values will be strings.

MetaDataValue—This field represents the actual value of the metadata. If the MetaDataPrompt is not null, then the MetaDataValue attribute is displayed to the user. Initially, the value presented at the Local UI is the default value defined by MetaDataDefaultValue. The user may edit or delete the value displayed at the local UI, thereby changing the value of the MetaDataValue attribute. If the value is left blank, or if the user deletes the suggested value, it is the decision of the recipient service interpreting the values in the job log whether those values are valid. It is assumed that the user knows what information is needed. If the MetaDataPrompt is NULL, then no display is made to the user at the Local UI, and the value stored in the MetaDataValue is the value of the MetaDataDefaultValue.

MetaDataRequiredEntry—This field defines that for an empty (null) MetaDataDefaultValue template attribute the user is prompted at the device to make an entry. The intention is to force the user to make an entry when they scan a job. The entry made by the user at the device UI will be presented in the job log as a value associated with the attribute MetaDataValue. If a template has been created with an empty (null) default value then the template creator may be able to specify that the user of that template make an entry at the device UI. This required field feature is intended to ensure that the template user does not forget to make a suitable metadata entry. If the metadata entry contains an empty (null) MetaDataPrompt value then that entry is not displayed to the user at the device UI. In this case, the attribute MetaDataRequiredEntry is always FALSE since it is not possible to prompt the user to make an edit to the MetaDataDefaultValue if that entry is not to be displayed to that user. If a template is created that for some reason contains a non-null MetaDataDefaultValue and the MetaDataRequiredEntry is TRUE then the device that is consuming that template shall ignore the default value and the user shall be prompted. This illegal combination could occur if a template-creating application has incorrectly populated these attributes.

MetaDataSource—This field is used to map the value held by the MetaDataFieldName attribute into a specific scheme. The intention of this attribute is to allow creation of templates that can map user provided data into a variety of third party schemes. This attribute provides the key mapping the user provided data into an appropriately named record from which data required by third party schemes can be extracted.

All metadata invocations should be named in order to provide accurate processing of the data. If more than one metadata invocation is used, the ordering may be changed at the local UI, to provide better understanding for the user. Named invocations will assist the matching of data to the corresponding invocation.

The following is an example of a job template for a simple scan to file application using the fields above. In this example, two attributes require user data entry. The data entry fields are CustomerNumber and InvoiceNumber. In this example, they happen to be associated with a document object; they could have easily been associated with services. The new attributes are accessed by a UserData attribute of type ref invocation which points to object instances that describe these attributes in the description object.

```
[service XRX_SVC_SCAN]
{
   ........
   ref_invocation OutputDocument = XRX_DOCUMENT:doc_1;
}
end
[service XRX_SVC_FILE]
{
   ........
   ref_invocation InputDocument = XRX_DOCUMENT:doc_1;
}
end
[doc_object XRX_DOCUMENT]
doc_1{
   string DocumentObjectName = "boo";
   enum_docformat DocumentFormat = PDF;
   ref_invocation UserData = XRX_DSCRPT_METADATA:foo_1,
XRX_DSCRPT_METADATA:foo_2;
}
end
description XRX_DSCRPT_METADATA]
# The following invocation DOES require the data entry as the default value is NULL.
   foo_1{
   string MetaDataFieldName = "CustomerNumber";
   string MetaDataPrompt = "Enter Customer Number";
   Boolean MetaDataRequiredEntry = TRUE;
   string MetaDataType = "string";
   string MetaDataValue = "";
   string MetaDataDefaultValue = "";
   }
   # The following invocation does NOT require the data entry as the default value is 123.
   foo_2{
   string MetaDataFieldName = "InvoiceNumber";
   string MetaDataPrompt = "Enter Invoice Number";
   Boolean MetaDataRequiredEntry = FALSE;
   string MetaDataType = "string";
   string MetaDataValue = "";
   string MetaDataDefaultValue = "123";
   }
   # The following invocation does NOT require the data entry as the MetaDataPrompt value is
   # NULL and MetaDataRequiredEntry is therefore always FALSE.
   foo_3{
```

-continued

```
string MetaDataFieldName = "InvoiceNumber";
string MetaDataPrompt = "";
Boolean MetaDataRequiredEntry = FALSE;
string MetaDataType = "string";
string MetaDataValue = "";
string MetaDataDefaultValue = "";
}
end
```

The metadata fields are presented to the user at the local UI and values are assigned. Once all values have been completed, then the job can be processed. After the job has been processed, a resulting job log is written out as follows: (Note that the MetaDataValue attribute has been filled in.)

```
[service XRX_SVC_SCAN]
{
   ........
   ref_invocation OutputDocument = XRX_DOCUMENT:doc_1;
}
end
[service XRX_SVC_FILE]
{
   ........
   ref_invocation InputDocument = XRX_DOCUMENT:doc_1;
}
end
[doc_object XRX_DOCUMENT]
doc_1{
   string DocumentObjectName = "boo";
   enum_docformat DocumentFormat = PDF;
   ref_invocation UserData = XRX_DSCRPT_METADATA:foo_1,
XRX_DSCRPT_METADATA:foo_2;
}
end
[description XRX_DSCRPT_METADATA]
# The following invocation shows the entry the customer made after receiving a reminder to make # an entry
   foo_1{
   string MetaDataFieldName = "CustomerNumber";
   string MetaDataPrompt = "Enter Customer Number";
   Boolean MetaDataRequiredEntry = TRUE;
   string MetaDataType = "string";
   string MetaDataValue = "I was reminded to make an entry";
   string MetaDataDefaultValue = "";
   } (XRX_STATUS_COMPLETED)
   foo_2{
   string MetaDataFieldName = "InvoiceNumber";
   string MetaDataPrompt = "Enter Invoice Number";
   Boolean MetaDataRequiredEntry = FALSE;
   string MetaDataType = "string";
   string MetaData Value = "ABC";
   string MetaDataDefaultValue = "123";
   } (XRX_STATUS_COMPLETED)
```

Several possible extensions to the metadata section include the addition of attributes for the tailoring of the user interface for each type of metadata added.

User Interface Service

MetaDataInputSource (type URI)—This attribute identifies a resource for entering user data into the document object.

MetaDataInputMask (type unknown) attributes. When designing a database, one option is to specify a field mask so that users enter only correctly formatted data, e.g., a 5-digit numeric field for a zip code application. Developers could restrict input errors as much as possible at the point of indexing to improve database accuracy.

DisplayMetaDataToUser attribute—an enumerated set of values by which the value display nature is determined. Values include NoDisplay, VisibleNoTouch, and Editable. These values determine whether the metadata can be seen or edited by the user. This attribute relates to UI presentation and it should be treated and assigned a value at the time we pick up the related user interface items above.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed:

1. A method for customizing a scanning device user interface, comprising:
   selecting a scanner user interface template to which to add a metadata field;
   creating a new metadata field;
   adding the metadata field to the user interface template;
   selecting attributes of the metadata field for which a user may later enter one or more values; and
   storing the metadata field such that the metadata field may be accessed from a user interface of a scanning device.

2. The method of claim 1, wherein selecting a template to which to add a metadata field includes creating a template.

3. The method of claim 1, further comprising selecting a default value associated with the metadata field.

4. The method of claim 1, wherein selecting attributes of the metadata field includes selecting whether the metadata field will be editable by a user.

5. The method of claim 1, wherein selecting attributes of the metadata field includes selecting a name for the metadata field.

6. The method of claim 1, wherein accessing the metadata field from a user interface of a scanning device includes selecting an update template feature from the user interface of the scanning device.

7. A method for adding a metadata field to a scanner user interface template, comprising:
   receiving a scanner user interface template selection;
   receiving a selection of a newly created metadata field to be added to the scanner user interface template selection;
   receiving properties of the newly created metadata field to be added to the template; and
   storing the properties of the newly created metadata field to be retrieved when the scanner user interface template is used such that the newly created metadata field may be downloaded to a scanning device in response to a signal from the scanning device.

8. The method of claim 7, further comprising displaying the metadata fields associated with a template in response to receiving a template selection.

9. The method of claim 7, wherein the selected template is a newly created template.

10. The method of claim 7, further comprising receiving a default value associated with the metadata field.

11. The method of claim 7, wherein the metadata field may be selected to be editable by the user.

12. The method of claim 7, further comprising displaying an update template feature to the user before downloading the metadata field to a scanning device in response to a signal from the scanning device.

13. The method of claim 7, further comprising displaying at least one template to the user.

14. The method of claim 7, further comprising displaying to the user a field in which to identify the metadata field.

15. A scanning device user interface method for scanning a document, comprising at a scanning device:
   selecting a template for scanning a document;
   selecting a metadata field associated with the template;
   entering information to be associated with the scanned document into the metadata field; and
   scanning the document.

16. The method of claim 15, further comprising updating the list of templates before selecting a template.

17. The user interface method of claim 15, wherein the entering information is performed by using a graphical keyboard.

18. A scanning device user interface method, comprising:
   receiving a template selection for scanning a document;
   receiving a metadata field selection;
   displaying a graphical interface;
   receiving a value for the metadata field;
   receiving a document to be scanned; and
   scanning the document.

19. The user interface method of claim 18, wherein the graphical interface includes a graphical keyboard.

20. A method for scanning a document, comprising:
   scanning a document;
   through a user interface, entering metadata to be stored with that document; and
   electronically storing the document and metadata.

21. A method for adding a metadata field to a scanner user interface template, comprising:
   receiving a scanner user interface template selection;
   receiving instructions to modify a metadata field of the scanner user interface template selection;
   receiving properties of the metadata field to be modified; and
   storing the properties of the modified metadata field to be retrieved when the scanner user interface template is used such that the metadata field may be downloaded to a scanning device in response to a signal from the scanning device.

* * * * *